United States Patent [19]

Zickwolf, Jr.

[11] 4,350,008
[45] Sep. 21, 1982

[54] METHOD OF STARTING TURBINE ENGINES

[75] Inventor: Herbert C. Zickwolf, Jr., Bozrah, Conn.

[73] Assignee: United Technologies Corporation, Hartford, Conn.

[21] Appl. No.: 107,461

[22] Filed: Dec. 26, 1979

[51] Int. Cl.³ ............................................... F02C 7/26
[52] U.S. Cl. ........................ 60/39.14 R; 60/39.28 R
[58] Field of Search ................... 60/39.14 R, 39.14 M, 60/39.28 R

[56] References Cited

U.S. PATENT DOCUMENTS

| | | | |
|---|---|---|---|
| 3,520,133 | 7/1970 | Loft et al. | 60/39.28 R |
| 3,686,859 | 8/1972 | White | 60/39.14 R |
| 3,793,825 | 2/1974 | Dickhart et al. | 60/39.14 M |
| 3,793,826 | 2/1974 | Holleboom et al. | 60/39.14 M |
| 3,844,111 | 10/1974 | Fenton | 60/39.14 R |
| 4,044,554 | 8/1977 | West | 60/39.14 R |
| 4,274,255 | 6/1981 | Pollak | 60/39.14 R |

*Primary Examiner*—Robert E. Garrett
*Attorney, Agent, or Firm*—Charles A. Warren

[57] ABSTRACT

A method of starting a gas turbine engine, particularly one having a high inertia rotor, in which the engine is cranked until sufficient air flow is available for lightoff, at which time fuel is injected at a fixed rate until ignition occurs, and fuel flow is then increased at a rate that is a function of rotor speed and ambient temperature. During the acceleration to operating speed, the turbine temperature is compared to a temperature reference that is based on rotor speed and ambient temperature and a lower fuel flow rate is selected, if necessary, to prevent overheating within the engine.

4 Claims, 1 Drawing Figure

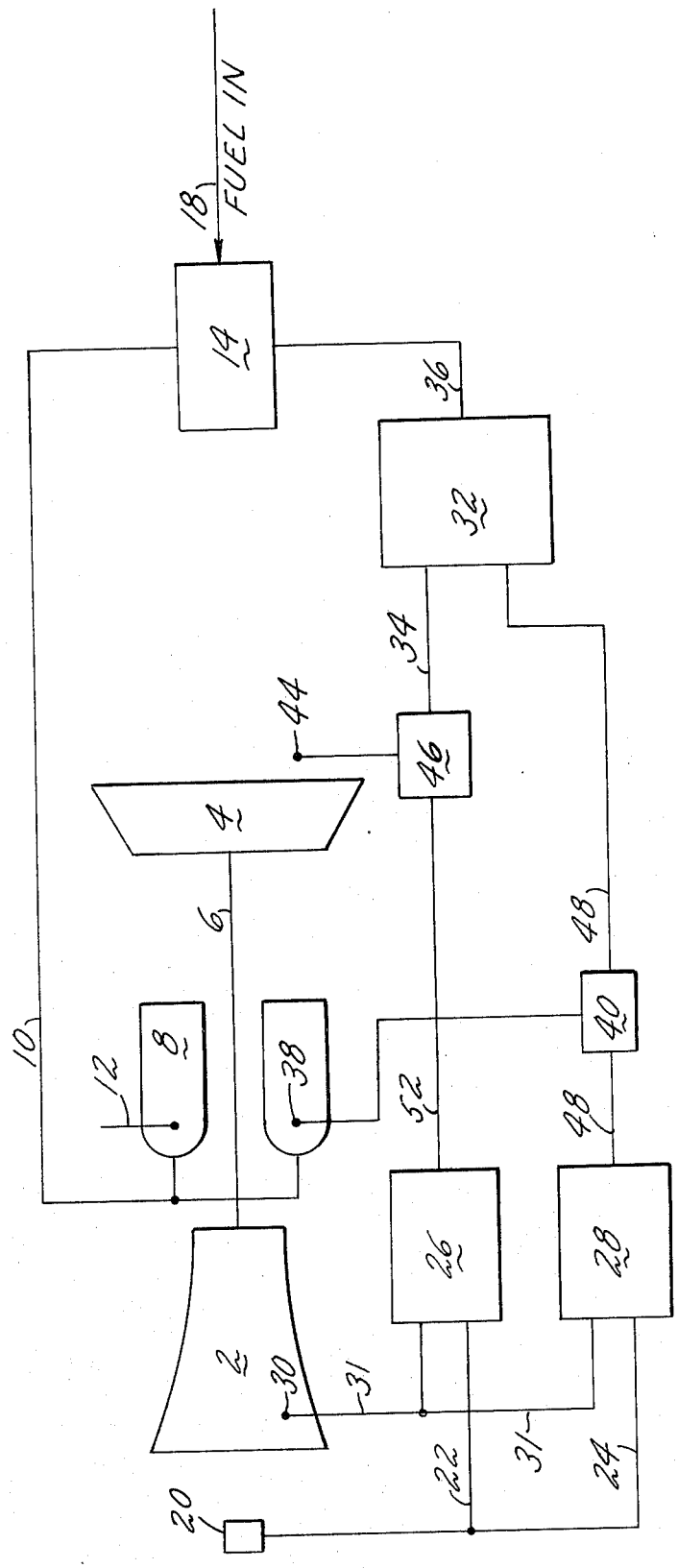

METHOD OF STARTING TURBINE ENGINES

BACKGROUND OF THE INVENTION

Present aircraft gas turbines or other gas turbines having low rotational inertia are brought up to operating speed (after ignition occurs) relatively quickly with relatively little danger of turbine overtemperature, due to the quick rotor response. However, in the case of engines having a high rotor inertia, acceleration occurs so slowly that the turbine may be damaged by introducing excessive fuel into the air passing through the engine, especially at low starting speeds. Also, in the case of advanced high performance engines that are optimized for best efficiency at high power, starting may be difficult in the low speed region due to unstable compressor operation, resulting in reduced airflow and attendant turbine overtemperature. A starting method which avoids these excessive temperatures is desirable to accelerate the engine to operating speeds as fast as possible without damage due to overtemperature.

SUMMARY OF THE INVENTION

One feature of the invention is a method for starting the engine by scheduling fuel flow rate of change in the increasing direction as a function of rotor speed and ambient temperature.

Another feature of the invention is protection against turbine overtemperature by scheduling a fuel flow rate of change in the decreasing direction in the event turbine temperature exceeds a prescheduled limit. The turbine overtemperature mode operates in the following manner: ambient temperature and rotor speed are used to derive a maximum turbine exit reference temperature. This reference temperature is compared with the sensed turbine exit temperature; and, if the sensed temperature is higher than the reference temperature, a decrease fuel flow command, at a rate of change that is proportional to the overtemperature, is derived. A select-low circuit allows the decrease flwo command to override the basic rate increase flow command described above, thereby reducing fuel flow to avoid turbine damage.

According to the invention, the engine is cranked until sufficient air flow is available for lightoff, at which time fuel is admitted at a fixed flow rate with an igniter in operation. When ignition occurs, the temperature rise that occurs in the burner is detected by a temperature sensing means and fuel flow is then increased in accordance with the basic rate of change schedule that is a function of rotor speed and ambient temperature. The temperature limiting control, which compares measured turbine exhaust temperature with a reference derived from rotor speed and ambient temperature, overrides the basic schedule and reduces flue flow when an overtemperature occurs.

The foregoing and other objects, features and advantages of the present invention will become more apparent in the light of the following detailed description of preferred embodiments thereof.

BRIEF DESCRIPTION OF THE DRAWING

The single FIGURE is a diagrammatic showing of the invention.

DETAILED DESCRIPTION OF THE PREFERRED EMBODIMENT

The engine is represented schematically by a compressor 2 and a turbine 4 on the same shaft 6 and a burner 8 between the turbine and compressor and receiving fuel from a supply conduit 10. An igniter 12 serves to ignite the fuel air mixture in the burner. A fuel valve 14 in the conduit 10 adjusts the flow of fuel in response to a signal reaching the valve through a signal duct 36. Fuel inlet to the valve 14 is through an inlet conduit 18. The ambient temperature at engine inlet is sensed by a probe 20 and this temperature signal is delivered by lines 22 and 24 to first and second schedulers 26 and 28. Engine speed is sensed by a speed indicator 30 and a speed signal is supplied to both schedulers 26 and 28 by line 31.

Scheduler 28 converts the speed and inlet temperature signal to a basic fuel flow rate of change command that is a function of both speed and temperature. This command reaches a select low circuit 32 through line 48 and the same command is delivered by line 36 to the fuel valve 14. In this way fuel is delivered to the engine to provide a preselected acceleration rate that is a function of speed and temperature. This acceleration rate is selected so that normally the quantity of fuel delivered will not cause overtemperature or compressor instability during engine acceleration by reason of an excess of fuel.

The signal to unlatch the fixed starting flow and permit the delivery of fuel to the engine at the basic rate is obtained from a temperature sensing means 38 in the burner. After ignition occurs, an increase in temperature in the burner will be signaled from the sensing means 38 to a control 40 in line 48 to permit the command from scheduler 28 to reach the fuel valve.

Temperature limiting scheduler 26 computes a maximum turbine exit reference temperature as a function of engine speed and ambient temperature and generates a signal which is supplied to circuit 46 by the line 52. Circuit 46 compares the temperature reference from scheduler 26 with the sensed turbine exit temperature 44 and, if the sensed temperature exceeds the reference signal, a decreasing rate of fuel flow command proportional to the overtemperature is sent through line 34 to the low select circuit 32. If the signal from scheduler 28 results in a turbine overtemperature because of the rate of acceleration of the turbine rotor, control circuit 32 will select the lower fuel rate established by the temperature limiting circuit 26.

The starting method of this invention is to first crank the engine which may be accomplished by an external driving motor or by blowing air into the compressor inlet, for example, until sufficient air flow is established to make possible fuel ignition in the burner. When sufficient airflow is reached, fuel at a fixed flow rate is injected into the burners, ignition being on, and this flow rate is continued until ignition of the fuel takes place. After ignition and a resulting temperature increase at the burners, detected by sensor 38, scheduler 28 sends a command to the fuel valve 14 to increase the fuel flow at a rate of increase which is a function of engine speed and ambient temperature, so as to cause engine acceleration at a rate which, normally, would avoid overtemperature in the turbine. This is especially critical in engines with limited compressor stability in the starting region or in engines having rotors with high inertia, since acceleration is necessarily slow.

Turbine temperature is continuously compared to a reference temperature that is computed as a function of rotor speed and ambient temperature. A second fuel flow rate of change is calculated as a function of the difference between reference and actual turbine temperatures; and, if lower than the basic fuel rate from scheduler 28, the lower rate is selected by circuit 32 and acceleration is continued at a lower rate until the overtemperature condition is corrected. This arrangement is particularly advantageous in that after lightoff the rotor will continue to accelerate at a safe rate unless a turbine overtemperature occurs. In that event, the mechanism will reduce fuel flow to correct the overtemperature. In this way, any of the problems resulting from turbine overtemperature are automatically avoided.

Although the invention has been shown and described with respect to a preferred embodiment thereof, it should be understood by those skilled in the art that other various changes and omissions in the form and detail thereof may be made therein without departing from the spirit and scope of the invention.

Having thus described a typical embodiment of my invention, that which I claim as new and desire to secure by Letters Patent of the United States is:

1. A method of starting a turbine engine including the steps of:
   cranking the engine until sufficient air flow is available for lightoff;
   admitting fuel at a fixed flow rate to the engine; igniting the fuel; and then
   increasing the rotor speed to operating speed by increasing the fuel flow at a rate of change that is a function of both rotor speed and ambient temperature.

2. The method of claim 1 including the step of detecting ignition of the fuel by sensing the resulting temperature rise in the combustion chamber of the engine.

3. The method of claim 1 including the additional step of protecting the engine against turbine overtemperature by causing a fuel flow reduction if the sensed turbine exit temperature exceeds a reference temperature derived from ambient temperature and rotor speed.

4. The method of claim 3 in which the speed function and ambient temperature generate a signal and the turbine exit temperature generates another signal, the method including selecting the lower value signal for controlling the fuel flow.

* * * * *

UNITED STATES PATENT AND TRADEMARK OFFICE
CERTIFICATE OF CORRECTION

PATENT NO. : 4,350,008

DATED : September 21, 1982

INVENTOR(S) : HERBERT C. ZICKWOLF, JR.

It is certified that error appears in the above-identified patent and that said Letters Patent is hereby corrected as shown below:

Column 1, line 42: "flwo" should be --flow--.

Column 1, line 57: "flue" should be --fuel--.

Signed and Sealed this

First Day of February 1983

[SEAL]

*Attest:*

*Attesting Officer*

GERALD J. MOSSINGHOFF

*Commissioner of Patents and Trademarks*